W. G. MORRIS.
TIRE CASING.
APPLICATION FILED JULY 12, 1913.

1,142,905.

Patented June 15, 1915.

Inventor
W. G. Morris

Witnesses

By W. P. Fitzgerald
Attorney

UNITED STATES PATENT OFFICE.

WILLIS G. MORRIS, OF MORRILL, NEBRASKA.

TIRE-CASING.

1,142,905. Specification of Letters Patent. Patented June 15, 1915.

Application filed July 12, 1913. Serial No. 778,681.

*To all whom it may concern:*

Be it known that I, WILLIS G. MORRIS, a citizen of the United States, residing at Morrill, in the county of Scotts Bluff and State of Nebraska, have invented certain new and useful Improvements in Tire-Casings; and I do hereby declare the following to be a full, clear, and exact description of the invention, such as will enable others skilled in the art to which it appertains to make and use the same.

My invention relates to new and useful improvements in protecting casings for vehicle tires.

The object of my invention is to provide a sectional, non-perforable casing adapted to cover the tread of a resilient vehicle tire, which will not interfere with the function of the tire.

With this object in view, the invention consists in the improved construction, arrangement and combination of the parts of a device of the character specified, which will be hereinafter fully described, and afterward specifically claimed.

Figure 1:
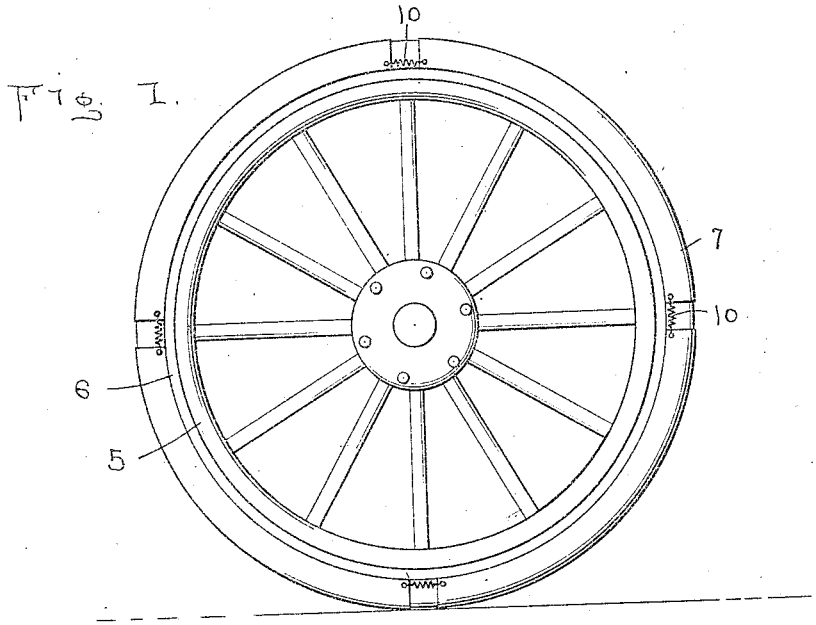
Figure 2:
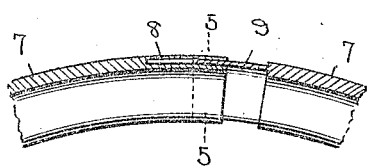
Figure 3:
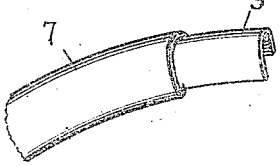
Figure 5:
Figure 4:
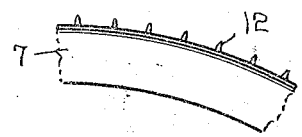

In order that the construction and operation thereof may be readily comprehended, I will now proceed to fully describe my invention in connection with the accompanying drawings, which illustrate an approved embodiment thereof, and in which drawings, Figure 1 represents a view in elevation showing a wheel and the approved form of my casing in place over the tire thereof. Fig. 2 represents a detail sectional view through the telescoping ends of two adjacent sections of the casing employed by me. Fig. 3 represents a perspective view of one end of one of the casing sections. Fig. 4 represents a detail view showing a portion of a casing section with outer elevations, and Fig. 5 represents a sectional view on the plane indicated by the broken line 5—5 of Fig. 2.

Like reference characters indicate the same parts wherever they appear in a plurality of the figures of the drawings.

Referring specifically to the drawings, 5 indicates the rim of a wheel, which may be of any desired construction, and shaped to carry a pneumatic tire 6. In order that the pneumatic tire 6 may be protected from injury and wear, I secure my improved form of casing over the tread thereof. The protecting casing is formed of a plurality of sections 7 and each section has one end reduced in size to form a tongue 9 and its opposite end chambered, as shown at 8, to receive the reduced end of the adjacent section. When adjacent sections are assembled upon a tire, the ends thereof are adapted to telescope, as shown in Fig. 2, so that the tread and inner surfaces of said sections will be in alinement. When the sections are disposed around the tread of a tire, the ends of the sections are telescoped, as indicated in Fig. 2, and when fitted snugly on the inflated tire, are held in such relation and in close engagement with the tread of the tire by means of the coil springs 10, which have their opposite ends secured to the ends of adjacent sections, as clearly shown in Fig. 1, forming a tire protecting casing having a smooth outward surface, without projecting ribs or other non-skid devices. It will be observed that the sections of the casing are U-shaped in cross section to fit over the tire and that the tongues 9 and chambers 8 are of similar shape. By this construction, it will be seen that the sections of the protecting casing will be closely held in engagement with the tread of the tire upon which they are placed.

When the wheel is in operation and a load is supported by the tire, the adjacent ends of the sections will be caused to telescope slightly more than normally, said sections resuming their normal positions when the wheel has turned sufficiently to carry said ends away from the ground.

In Fig. 4, I have shown a section of a tread casing, the tread portion of which is provided with a plurality of outwardly extending elevations 12 which are adapted to engage in the surface of the ground, over which the wheel is traveling, and prevent slipping or skidding of the same. Any other form of non-slipping projections may be formed integrally with or secured upon the sections of the casing.

While I have specifically described the exact construction and arrangement of the component parts of my invention, it will be obvious to those skilled in the art to which the invention most nearly appertains, that slight changes and variations may be made therein, within reasonable limitations, without departing from the spirit and scope of the invention.

Having thus fully described my inven- tion what I claim and desire to secure by Letters Patent of the United States is:—

A tire casing comprising; a plurality of sections, U-shaped in cross section, and curved longitudinally to form a portion of a circle, a chamber formed in one end of each section having side walls, a tongue formed in the opposite end having side edges parallel with, but offset from the side edges of the section, said tongue adapted to snugly seat in the chamber of a neighboring section for longitudinal movement, the side edges of the tongue engaging the side walls of the chamber to prevent lateral displacement of the tongue during longitudinal movement, and resilient means connecting the sections adjacent the corners thereof.

In testimony whereof I have signed my name to this specification in the presence of two subscribing witnesses.

WILLIS G. MORRIS.

Witnesses:
JOHN R. RUSSELL,
RAY A. BULLOCK.